INVENTOR.
MELVIN S. FALCK JR.
BY Lulwider, Patton, Rieber Lee, and Utecht
ATTORNEYS Dec. 16, 1969 M. S. FALCK, JR 3,484,771

ALARM SYSTEM

Filed Dec. 22, 1966 2 Sheets-Sheet 2

INVENTOR.
MELVIN S. FALCK JR.
BY Fulwider, Patton, Rieber, Lee, and Utecht
ATTORNEYS United States Patent Office 3,484,771
Patented Dec. 16, 1969

3,484,771

ALARM SYSTEM

Melvin S. Falck, Jr., Sepulveda, Calif., assignor to Morse Products Manufacturing, a partnership Filed Dec. 22, 1966, Ser. No. 603,849
Int. Cl. G08b 17/06, 25/00
U.S. Cl. 340—217 9 Claims

ABSTRACT OF THE DISCLOSURE

An alarm system for a plurality of different stations connected by a common transmission line to a central office. Each station is identified at the central office by means of a numerical code unique to that section. The apparatus at each station includes a transmission line monitor which indicates whether the line is occupied and, if it is, the transmission of a signal from the station is delayed for a predetermined time period. An alarm discriminator determines whether an alarm or reset signal is transmitted to the central station and, to facilitate closing the station, an auxiliary logic network controls the discriminator so that only one particular signal is transmitted to the central station when a particular sequence of alarm and reset events occur.

Figure 1:
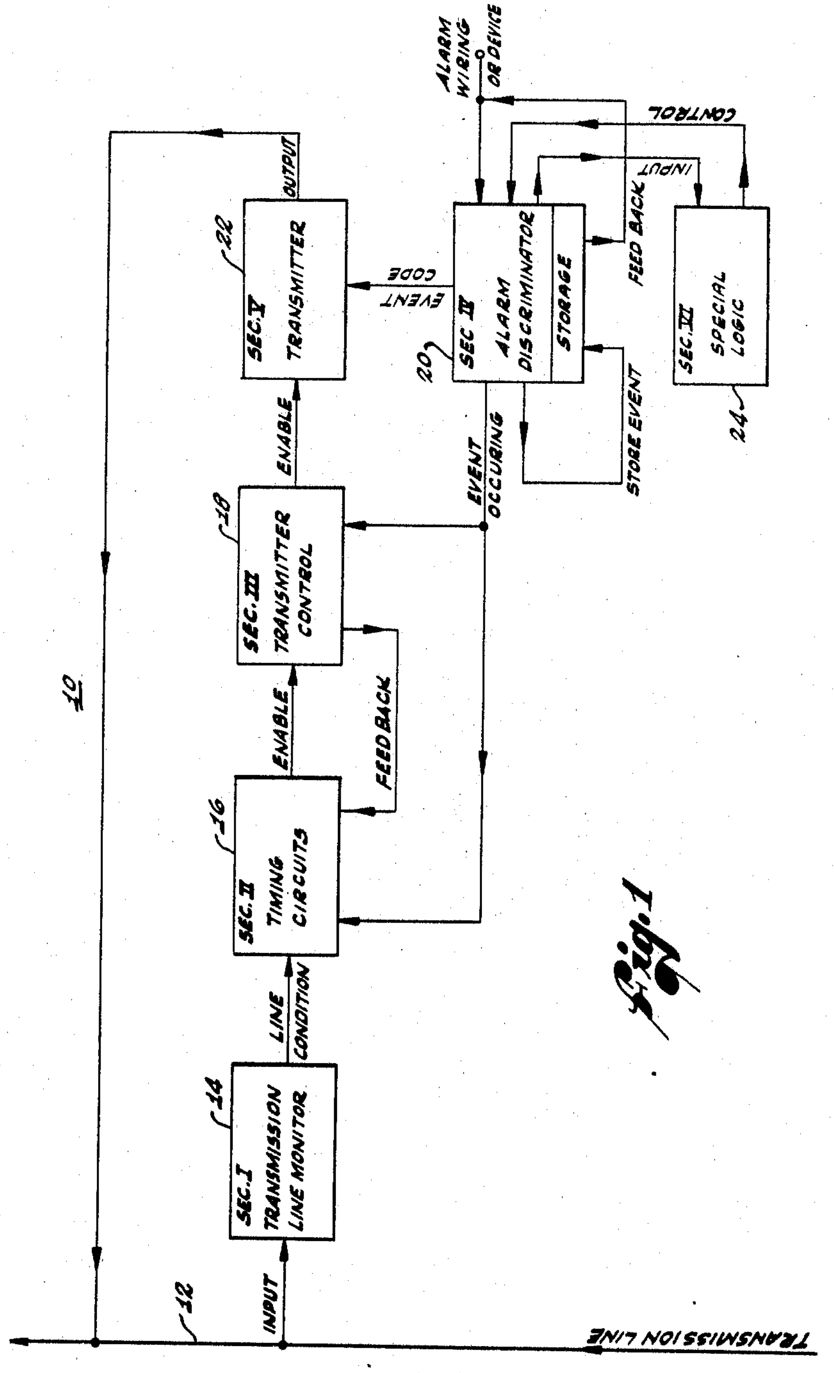

The present invention relates to improvements in alarm systems, and more particularly, to a novel alarm system which is particularly suited to use as a burglar alarm system and which allows a plurality of different stations to utilize and transmit over a common transmission line.

"Alarm system" is a generic term for any system designed to monitor and indicate the occurrence of a predetermined condition. One form of alarm system is a system wherein a plurality of different locations, referred to as "stations," are serviced from and connected to a single location, commonly called a "central office." A typical example of such a system is a burglar alarm system wherein the stations comprise separate buildings protected by the system and the central office is the office of the company providing burglar protection service to the owners or operators of the buildings.

Historically, early burglar alarms systems were designed such that each station was connected by a separate transmission line to the central office—usually low-grade telephone lines capable of carrying only very low frequency signals. The use of separate transmission lines for each station proved to be very expensive and complex particularly at the central office where separate receiving equipment was employed for each station.

Today burglar alarm systems overcome many of the problems of their predecessors by (1) employing a common, low grade transmission line to connect all stations to the central office and (2) employing common receiving equipment in the central office.

In such burglar alarm systems, it is common practice for the stations to each include a transmitter for generating and transmitting pulse code signals to the central office indicative of the particular station and the various conditions being monitored at the station. For example, the pulse code signal generated by a given station may comprise a series of three pulses followed by a space, and then a series of two pulses, indicating the number 32. The number 32 identifies the particular station while the number of times the number 32 is repeated, that it, the number of "rounds," indicates the condition being monitored at the station. Thus, the number 32 may be transmitted three times when an alarm condition exists indicating an unauthorized entry, and the number 32 may be transmitted once when the alarm condition is removed to indicate a reset condition at the station.

Unfortunately, the use of a common transmision line presents problems of simultaneous transmission from different stations and the loss of important signal information indicative of alarm conditions. To reduce the chances of such occurrences, the number of stations serviced by a single transmission line is strictly limited. For a company providing protection to large numbers of customers, however, this means that separate systems must be used for different groups of customers again resulting in duplication of equipment and increased cost and complexity over the single large system employing a common transmission line.

Another shortcoming of such conventional burglar alarm systems is the length of time required for the stations to transmit pulse signals indicative of predetermined sequences of events such as those surrounding the closing of the station building and the setting of the station equipment in a state ready to detect unauthorized entrances. Such information is extremely important in that it assures the central office that any subsequent code from the station is an alarm condition representing an unauthorized entrance. To insure that the code for closing will not be misread at the central office, it has heretofore been common practice for the closing code to comprise separate pulse code signals for each step in the closing operation. For example, it has been common practice to generate a first code signal indicative of the turning on of the station equipment, followed by a second code signal indicative of the opening of the exit door, followed by a third code signal indicative of the closing of the exit door—the total code indicating a closing of the station building. Due to the low-grade character of the transmission line and the low frequency of the signals transmitted thereon, closing becomes a very lengthy process.

In view of the foregoing, it is a general object of the present invention to provide an improved alarm system which overcomes the previously referred shortcomings of alarm systems including the plurality of stations serviced by a common central office.

Another object of the present invention is to provide an alarm system of the foregoing character which permits a plurality of stations to use a common transmission line without fear of losing alarm signal information thereby allowing extremely large numbers of stations to be serviced by the common line.

A further object of the present invention is to provide an alarm system of the foregoing character including at each station means for delaying the transmission of alarm signal information from the station until the common transmission line is clear of transmission from all other stations.

Still another object of the present invention is to provide an alarm system of the foregoing character including means at each station for generating a single alarm signal in response to a predetermined sequence of events at the station, such as those associated with closing, thereby materially reducing the time for processing closing information at the central office.

A still further object of the present invention is to provide an alarm system of the foregoing character including means at each station for transmitting different signals for different events occurring at the station.

The above, as well as other objects and advantages of the present invention, may be more clearly understood by reference to the following detailed description, when considered with the drawings which, by way of example only, illustrate one form of alarm system embodying the features of the present invention.

Figure 2:
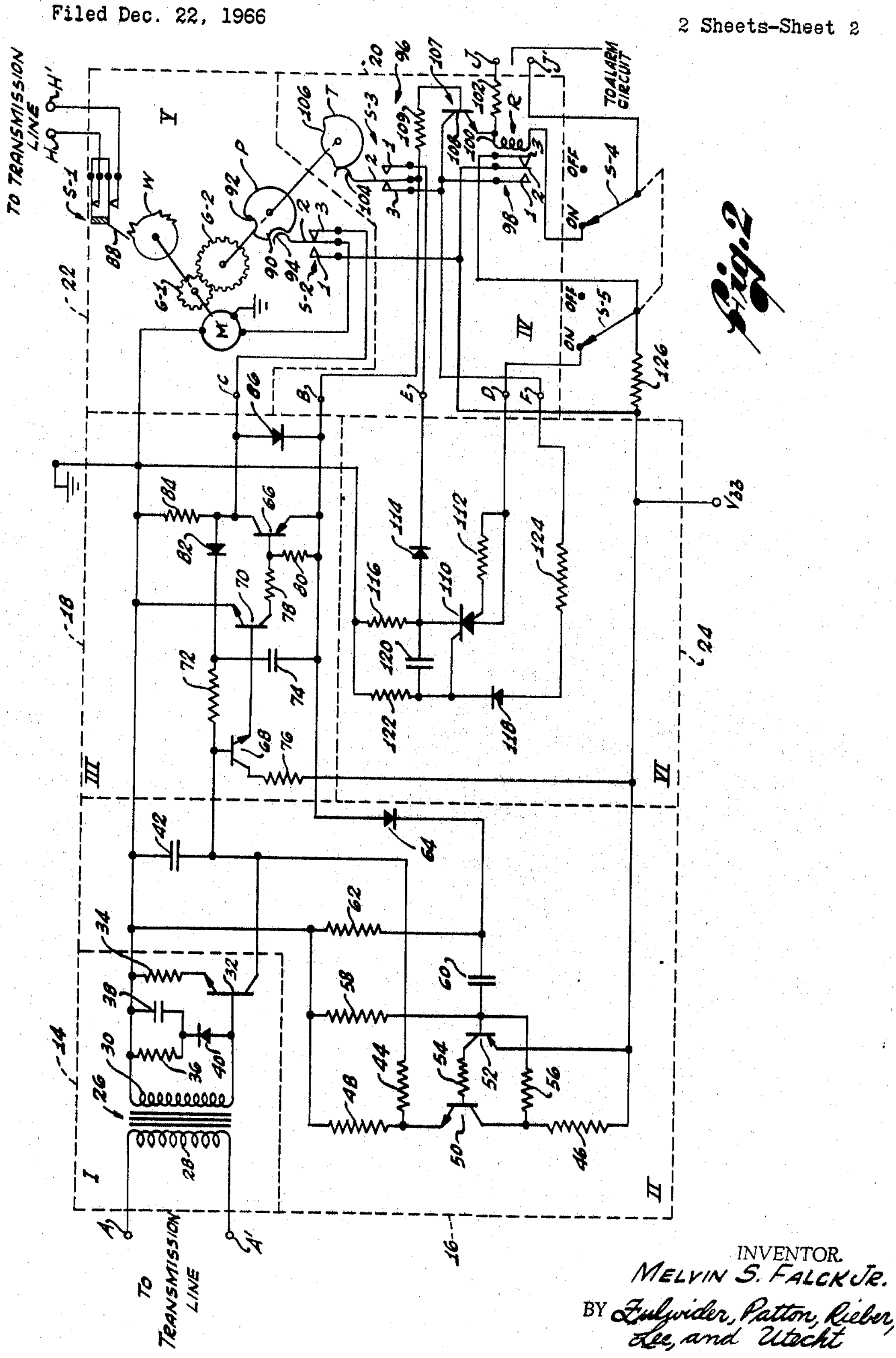

In the drawing:

FIGURE 1 is a block diagram illustrating the equipment included at each station in an alarm system including a plurality of such stations connected by a common transmission line to a central office; and FIGURE 2 is a wiring diagram of the station equipment illustrated in FIGURE 1.

Generally speaking, the drawings represent equipment at one of stations 10 in an alarm system of the present invention. Other similar stations are included in the alarm system, and all are connected by a common transmission line 12 to a central office.

The station 10, like all other stations of the system, includes a transmission line monitor 14, timing circuits 16, a transmitter control unit 18, an alarm discriminator 20, a transmitter 22, and a special logic unit 24.

GENERAL DESCRIPTION

Generally speaking, the transmitter 22 is connected to the transmission line 12 and is adapted to generate and transmit various coded signals indicative of the various conditions being monitored by the station 10. By way of example only, in the illustrated form of the station 10, the transmitter 22 is designed to generate an alarm signal indicative of an alarm event and a reset signal indicative of a reset event, that being a correction of the alarm event.

The transmission line monitor 14 is also connected to the transmission line 12, and monitors the electrical signals theron. Basically, the monitor 14 provides an indication to the transmitter control unit 18 as to when the transmission line 12 is clear and when the line is occupied.

The alarm discriminator 20 is designed to perform three distinct functions. First, the discriminator is adapted to develop an event signal upon the occurrence of an alarm or reset event in the alarm wiring or circuitry connected thereto. Secondly, the discriminator is adapted to store the event signal when the monitor 14 indicates that the transmission line 12 is occupied. Thirdly, the alarm discriminator 20 is adapted to control the transmitter 22 to generate a coded signal which corresponds to the type of event then occuring or, in the case of the storage of an event signal, the type of event which last occurred.

The transmitter control unit 18 is connected to the monitor 14, the alarm discriminator 20, and the transmitter 22, and is adapted to energize the transmitter in response to an event signal developed by the alarm discriminator when the monitor indicates that the transmission line is clear.

The timing circuits 16 are responsive to an event signal from the alarm discriminator 20. If the transmission line 12 is occupied, the timing circuits 16 delay the indication of a clear line by the monitor 14 for predetermined times after the transmission line is clear. In this manner, the timing circuits 16 insure that the transmission line is clear prior to the transmission of the alarm or reset code signals by the transmitter 22.

Accordingly, when an alarm event occurs, as detected by a change in the condition of the alarm wiring or circuitry connected to the alarm discriminator 20, the alarm discriminator develops an event signal. If the transmission line 12 is clear, as indicated by the monitor 14, the event signal immediately causes the transmitter control unit 18 to energize the transmitter 22. The transmitter 22 is then controlled by the alarm discriminator 20 to generate and transmit a coded signal corresponding to the alarm condition indicated by the associated alarm circuitry.

If the transmission line 12 is occupied at the time of an alarm event, the event signal developed by the alarm discriminator 20 is internally stored and the timing circuits 16 function to introduce predetermined periods of delay into the station equipment to insure that the transmission line 12 is clear at the time the monitor 14 again indicates a clear transmission line. Then, the event signal is automatically withdrawn from storage within the alarm discriminator 20 to cause the transmitter control unit 18 to excite the transmitter 22 as previously described.

After the transmitter 22 has generated and transmitted an alarm signal on the transmission line 12, a subsequent correction of the alarm event, as by a closing of the associated alarm wiring or circuitry, causes the alarm discriminator to again develop an event signal. If the transmission line is clear, the event signal enables the transmitter 22 to generate a reset code signal on the transmission line to indicate to the central office that the alarm condition has been corrected.

In addition to the foregoing features, the equipment at the station 10 includes the special logic 24. The special logic cooperates with the alarm discriminator 20 to cause the discriminator to develop a single event signal in response to a predetermined sequence of events; such as the events surrounding the closing of the station 10. Therefore, rather than generating three different code signals as in common in conventional alarm systems, the equipment at the station 10 generates a single signal indicative of closing which is produced by a combination of the events surrounding closing. This materially reduces the time required to transmit signals indicative of closing, and allows for more efficient use of the receiving equipment in the central office.

Since operation of the transmitter 22 is automatically delayed until a transmission line 12 is clear, there cannot be a simultaneous transmission from different stations. Accordingly, there are no problems of loss of signal information from the various stations. This allows the alarm system of the present invention to safely utilize a common transmission line and common receiving equipment at the central office for a much greater number of stations than conventional systems. The use of the present invention therefor represents a real cost savings to the owner of the system which in turn can be passed on to his customers.

TRANSMISSION LINE MONITOR

Referring more specifically to FIGURE 2, the transmission line monitor 14 includes a transformer 26 having a primary winding 28 connected to the transmission line 12 and a secondary winding 30 with end terminals connected to the base of an NPN-type transistor 32 and to a resistor 34 connected to the emitter of the transistor. The monitor 14 also includes a diode 40 connected to the base of the transistor 32 and to a parallel circuit comprising a resistor 36 and a capacitor 38 connected to a junction of the secondary winding 30 and the resistor 34.

The transformer 26 presents a minimum resistance to the line 12 and in the monitor 14, removes any DC component upon the transmission line and allows only AC signals to pass to the transistor 32.

With regard to the transmission line 12, it is of the low-grade telephone line type commonly employed in burglar alarm systems of the type herein described. Accordingly, the signal-to-noise ratio on the transmission line 12 is extremely poor and sometimes the instantaneous amplitude of noise on the transmission line is of the same order of magnitude as the signals being transmitted thereon. Under such conditions, the resistor 36 and capacitor 38 function as an integrator to provide means for positively identifying the transmitted signals and distinguishing them from noise signals. This is possible since the average energy contained in the noise signals is always small compared to that of the transmitted signals. The noise signals are therefore effectively shunted to ground by the integrator circuit while the transmitted signals are integrated and provide sufficient energy to the base of the transistor 32 to cause the transistor to conduct. In this regard, the base-emitter diode in the transistor 32 and the resistor 34 provide a small voltage threshold preventing the transistor from switching to a conductive state in response to low amplitude, high energy noise signals, such as 60-cycle AC induced in the transmission line from nearby power cables.

Accordingly, when transmission line 12 is clear of transmitted signals, there is insufficient A-C energy on the line to cause the transistor 32 to conduct. The monitor is then indicating a "line clear" condition. However, A-C signals on the line cause the transistor 32 to conduct, thereby indicating a "line occupied" condition.

The "line clear" and "line occupied" conditions are reflected in the voltage on a capacitor 42 in the timing circuits 16.

TIMING CIRCUITS

As illustrated in FIGURE 2, the capacitor 42 is connected between the collector of the transistor 32 and the resistor 34 which, in the illustrated circuit, is connected to ground. The conducting transistor 32 provides a rapid discharge path for the capacitor 42 to ground the discharged capacitor 42 indicating a "line occupied" condition. When the transistor 32 is non-conducting, however, the capacitor 42 charges through a resistor 44 to a voltage set by a voltage divider consistnig of resistors 46 and 48 and a transistor 50, the voltage divider being connected between a voltage source $V_{bb}$ and ground. The charged capacitor 42 representing a "line clear" condition, provides a sufficient voltage to enable the transmitter control unit 18 to energize the transmitter 22 upon the occurrence of an event signal, and occurs a predetermined time X after the transistor 32 ceases to conduct.

Because of the time required for the capacitor 42 to reach its charge state, the timing circuits 16 insure that the transmitter control unit 18 and hence the transmitter 22 will not be energized until such time as the transmission line 12 is truly clear of all other transmission.

In this respect, it should be recalled that the signals transmitted on the transmission line 12 are of a pulse code type comprising separate series of pulses conforming to different numbers indicative of the different stations in the system. The series of pulses are repeated predetermined numbers of times to provide an indication of the condition being monitored at the stations. For example, to indicate an alarm condition at a given station, the station may generate three pulses followed by a space and then a series of two pulses indicative of the number "32" identifying the station. The station may then send the number "32" two more times to indicate the alarm condition.

In such an arrangement, there is a minimum time interval between consecutive digits in a pulse coded number corresponding to a space between the last pulse of one digit and the first pulse of the next digit. A maximum time may also be established for such a time interval. If the maximum time is exceeded without the beginning of another digit, it is assumed that the transmitter of the reporting station has completed transmission and is no longer occupying the line. In the present invention, the maximum time interval is X seconds, and corresponds to the time required to charge the capacitor 42 from the voltage divider and through the resistor 44, after the transistor 32 becomes nonconductive. Therefore, the timing circuits 16 insure that the capacitor 42 will not reach a charged state sufficient to enable the transmitter control unit 18 until after all other transmission on the transmission line has been completed, as indicated by the lapse of a time interval at least equal to X seconds.

Not only is it common practice that there exist a maximum time interval between consecutive code pulses, but there is also a maximum number of rounds or repetitions of the pulse codes from any given station. The maximum number of rounds or repetitions takes a predetermined amount of time and becomes the maximum time, Y seconds, any station may occupy or transmit on the transmission line 12. In the timing circuits 16, if the transmission line 12 is occupied upon the occurence of an event, the charging of the capacitor 42 is inhibited for a period of Y minus X seconds and then when the transmission line is clear, as indicated by a turning off of the transistor 32, the charging of the capacitor takes X seconds. Therefore, in the present invention the minimum time delay introduced by the timing circuits 16 is Y seconds.

The circuitry for charging the capacitor 42 when the transmission line 12 becomes clear has been previously described.

The circuitry for inhibiting the charging of the capacitor 42 for Y minus X seconds includes a transistor 50 and a transistor 52. Transistor 50 is of an NPN-type having an emitter connected to a junction of the resistors 44 and 48, and a collector connected to the resistor 46. The base of the transistor 50 is connected by a resistor 54 to the collector of the transistor 52 which is of a PNP-type. The emitter of the transistor 52 is connected to $V_{bb}$ while a feedback resistor 56 connects the collector of the transistor 50 to the base of the transistor 52. The base of the transistor 52 is connected to a resistor 58 and to a capacitor 60. The resistor 58 in turn is connected to ground while capacitor 60 is connected to a junction of a resistor 62 and the cathode of a diode 64. The resistor 62 is also connected to ground while the anode of the diode 64 is connected to a terminal B which, as will be described in greater detail hereinafter, is connected to $V_{bb}$ through the alarm discriminator 20 to indicate an event signal when an event occurs in the alarm circuitry connected to the discriminator.

If the transistor 50 is conducting, voltage at the emitter of the transistor is above ground potential and the capacitor 42 reaches a voltage high enough to enable the transmitter control unit 18. As previously described, the time constant of the circuit for charging the capacitor 42 through the conducting transistor 50 is such that the capacitor is charged in exactly X seconds. This provides the minimum delay for the transmitter 22 and insures that it will not begin to generate its own code while another station which is occupying the transmission line 12 is merely between pulses.

In the timing circuits 16, the base of the transistor 50 is driven by the transistor 52 through the resistor 54. The resistor 56 provides base current for the transistor 52 from the collector of the transistor 50 in a feedback arrangement. With such a circuit arrangement, when an event occurs, as indicated by the connection of $V_{bb}$ to the terminal B, the sudden increase in the potential at terminal B is reflected across the capacitor 60 to the base of the transistor 52, causing the transistors 52 and 54 to immediately turn off. The feedback resistor 56 no longer provides sufficient base current to drive the transistor 52 and both transistors remain off.

The resistor 58, however, is connected to ground and provides a charging path for the capacitor 60. The time constant of the circuit, including the capacitor 60 and the resistor 58, is such that after a period of Y minus X seconds, the voltage on the capacitor 60 is sufficient to begin turning on the transistor 52. As this occurs, the transistor 50 begins to conduct, feedback current is provided to the base of the transistor 52, and the transistor 50 is latched on. Then, the resistor 44 is again able to provide a charging path for the capacitor 42 and the transmitter control unit will be enabled in X seconds if no more transmission occurs on the line 12. The resistor 62 provides a discharge path for the capacitor 60 after $V_{bb}$ is removed from terminal B so that the whole process may be repeated when the next event occurs.

Accordingly, it is appreciated that if an event occurs at a given station when the transmission line 12 is occupied, the transmitter for the station is first inhibited for a period of Y seconds. After Y seconds, if the line is still occupied, the transmitter is inhibited until X seconds after the transmission line becomes clear of signals. For example, if an event occurs at a station M and the line is clear, the transmitter of M begins transmitting immediately. If, while M is transmitting, an event occurs at station N, the transmitter at N will be inhibited for Y seconds. If another station O has an event occur at a certain time *t* after the event at station N, but while the transmitter of station M is still transmitting, then the transmitter of station O will also be inhibited for Y seconds after the event has occurred at station O. Thus, after the transmitter of station M is finished reporting and the transmitter of station N has been inhibited for Y seconds, it will see an unoccupied line and begin transmitting. Meanwhile, the transmitter at station O will still be inhibited for a time *t* after the transmitter of sation N begins transmitting. If transmitter N is still occupying the line Y seconds after the event occurred at station O, the transmitter of station O will be inhibited until X seconds after the transmitter of station N is finished transmitting.

TRANSMITTER CONTROL UNIT

As previously indicated, the transmitter control unit 18 is responsive to an event signal developed by the alarm discriminator 20 to energize the transmitter 22 when the monitor 14 indicates that the transmission line is clear. In this regard, the transmitter control unit 18 also functions to override the timing circuits 16 when an event signal occurs and the capacitor 42 is charged indicating a clear transmission line. The control unit 18 thereby insures that the transmitter 22 will immediately generate the pulse code signal dictated by the alarm discriminator 20 when the line 12 is clear at the occurrence of an alarm or reset event.

To accomplish the foregoing, the transmitter control unit 18 includes an output transistor 66 and an emitter-follower arrangement of transistors 68 and 70 acting as an input to the transmitter control unit.

The transistor 68 is an NPN-type transistor having its base connected to a junction of the capacitor 42 and the resistor 44, as well as to a series circuit consisting of a resistor 72 and a capacitor 74 connected to the terminal B. The collector of the transistor 68 is connected to the resistor 76 which in turn is connected to $V_{bb}$. The emitter of the transistor 68 is connected to the base of the transistor 70.

The transistor 70 is also of the NPN-type having its emitter connected to ground and its collector connected to a resistor 78. The resistor 78, in turn, is connected to a junction of the base of the transistor 66, and a resistor 80 connected in common to the emitter of the transistor 66 and the terminal B.

The output transistor 66 is of an PNP-type having its collector connected to an output terminal C, the anode of a diode 82 in series with the resistor 72, and by a resistor 84 to ground. A diode 86 is connected between the emitter and collector of the transistor 66 and between the terminal B and C to protect the output transistor from transients which may be present at terminal C during operation of the station 10.

In operation, the output transistor 66 conducts when $V_{bb}$ is applied to terminal B, indicating an event signal and when there is sufficient charge on the capacitor 42, indicating that the transmission line 12 is clear. In this regard, the transistor 68 senses the voltage on the capacitor 42. When the transistor 68 is conducting, base current for the transistor 70 is supplied from $V_{bb}$ through the resistor 76. The transistor 70 in turn drives the output transistor 66 through the resistor network consisting of resistors 80 and 78, such that the output transistor 66 conducts when an event signal is applied to the terminal B and there is sufficient charge on the capacitor 42 indicating a clear transmission line 12.

When the output transistor 66 is conducting, a feedback current flows through the diode 82 and the resistor 72 to the capacitor 42. The feedback signal maintains the capacitor 42 in a charged condition despite the fact that the event signal triggering the output transistor 66 also causes the transistors 50 and 52 in the timing circuits 16 to become nonconductive. The feedback circuit also maintains the output transistor 66 in a conducting state. Thus, the transmitter control unit 18 effectively overrides the operation of the timing circuits 16 when the monitor 14 is indicating that the transmission line 12 is clear by the charged capacitor 42.

However, if the monitor 14 indicates by an insufficiently charged capacitor 42, that the transmission line 12 is occupied the output transistor 66 does not conduct and the transmitter control unit 18 does not override the timing circuits 16 when an event occurs as indicated by an event signal at terminal B. Under such conditions, the timing circuits 16 introduces the previously described, predetermined periods of delay into the charging of the capacitor 42 and the subsequent energizing of the transmitter 22.

In the transmitter control unit 18, the diode 82 prevents the capacitor 42 from discharging through the resistor 72, while the resistor 84 prevents leakage through the non-conducting transistor 66 from charging the capacitor 42. The capacitor 74 is provided to insure that feedback occurs if the transistor 66 is enabled at a time of an event signal from the alarm discriminator 20.

TRANSMITTER

The transmitter 22 may entail a variety of devices as long as certain requirements are met. First of all, the transmitter 22 must be capable of being programmed by the alarm discriminator 20 to generate pulse code signals indicative of the various events being monitored by the circuitry connected to the alarm discriminator. Secondly, a transmitter 22 must be capable of transmitting whenever the terminal C is excited, and must be capable of completing the programmed code signal once it has been enabled by the transmitter control unit 18, irrespective of the changes in the remainder of the equipment at station 10. Finally, the transmitter 22 must be capable of providing the alarm discriminator 20 with information indicative of the event code signal being generated thereby.

The type of devices employed in the transmitter 22 depends upon the exact nature of the coding system to be used. Accordingly, the transmitter may vary from a strictly mechanical arrangement involving a motor-driven mechanical commutator to an entirely electronic system. In FIGURE 2, the transmitter 22 is illustrated as being of a mechanical type intended for use with the particular form of alarm discrimination 20 shown in FIGURE 2.

In the illustrated form of the transmitter 22, the code is transmitted by means of opening and closing a switch S–1 which is connected in series with the transmission line 12 at terminals H and H'. The switch S–1 is activated by a toothed wheel W which is connected by a shaft to the transmitter motor M. As the motor M runs, an actuator arm 88 on the switch S–1 travels up the side of the tooth on the wheel W, and the switch S–1 opens. As the wheel W continues to revolve, the actuator arm 88 falls between the teeth of the wheel and the switch S–1 again closes. The opening and closing of the switch S–1 produces a pulse on the transmission line 12 and one revolution of the wheel W generates a "round" of pulses corresponding to the code for the station 10.

The particular sequence of pulses for indicating the station 10 may be selected by removing teeth from the wheel to provide spaces, leaving the rest to provide pulses from the switch S–1 for transmission on the line 12. In the illustrated example, the wheel W includes two teeth, then a space, and a series of three teeth. Accordingly, the pulse code generated by the transmitter 22 corresponds to the number "23." The number "23" indicates the particular station 10 in the over-all alarm system, while the number of times that the number "23" is generated, that is, the number of rounds, indicates the condition being monitored at the station.

In the transmitter 22, and in the alarm discriminator 20 illustrated in FIGURE 2, three rounds of the pulse code "23" indicate an alarm event while a single round of the pulse code "23" indicates a reset event, that is, a correction of the alarm event in the alarm circuitry connected to the alarm discriminator.

To accomplish this, the transmitter 22 includes a relatively large gear G–2 which is run by the relatively small gear G–1 to provide a speed reduction which, in this example, is 4:1. A cam P is attached to the gear G–2 and revolves one-quarter revolution for each round transmitted by the switch S–1 and the wheel assembly W. The cam P includes two depressions 90 and 92 spaced 90° and 270° apart. A cam follower 94 is adapted to engage and ride along the outer surface of the cam P into and out of the depressions 90 and 92. The cam follower 94 is connected to the movable contact 2 of a switch S–2 which controls the operation of the motor M in response to energies supplied to the switch from the terminal C. In this regard, the contact 2 is connected to the motor which in turn is connected to ground while the contact 3 of the switch is connected to the terminal C and the contact 1 to $V_{bb}$.

Thus arranged, whenever the follower 94 is in a depression, the contacts 2 and 3 of the switch S–2 are closed to connect terminal C to the motor. Accordingly, whenever, $V_{bb}$ appears at terminal C indicating that an event has occurred and that the transmission line 12 is clear, the motor M is energized and begins turning the wheel W and the cam P. As the cam P begins to turn, the follower 94 rides out of the depression, causing the contact 2 to move against the contact 1 to directly connect $V_{bb}$ to the motor M. $V_{bb}$ is applied to the motor M and insures that the motor will continue to run until the follower 94 reaches the next depression in the cam P. When the cam follower 94 reaches the next depression, the circuit from $V_{bb}$ to the motor is terminated and the contact 2 moves against the contact 3. Unless $V_{bb}$ is still at terminal C, the motor stops.

With the arrangement described, and since the depression 92 and 90 in the cam P are 270° and 90° apart and a 4:1 gear reduction exists between the wheel W and the cam P, three rounds of pulse codes will be generated by the transmiter 22 as the follower moves between the depressions 90 and 92, while a single round will be generated while the follower moves between the depressions 92 and 90. As previously indicated, the three rounds of pulse codes indicate an alarm event while a single round indicates the reset event.

More specifically, suppose the cam P is in the position shown in FIGURE 2. If $V_{bb}$ appears at terminal C, then the motor M is committed to run until the cam P has traveled through 270° of its rotation. At a 4:1 ratio, this corresponds to the three rounds being transmitted by the transmitter 22. After the three round code is transmitted, the motor M is again under control of the terminal C. If $V_{bb}$ again appears at terminal C, the motor M is committed to run until the cam P rotates through 90° to the next depression, which rotation corresponds to one round of signals being transmitted. Accordingly, the transmitter arrangement illustrated in FIGURE 2 assures that the transmitter will not stop during the reporting of an event, and that the transmitter will run whenever $V_{bb}$ appears at terminal C.

In the transmitter 22, the rotational output from the gear G–2 provides means for enabling the alarm discriminator 20 to determine the completion of a coded signal by the transmitter as well as means for indicating in the discriminator which code was last transmitted. The transmitter thereby enables the alarm discriminator 20 to accurately program the pulse codes generated by the transmitter to correspond to the particular events, that is the alarm and reset events, monitored by the circuitry connected to the discriminator.

ALARM DISCRIMINATOR

With regard to the foregoing matter, the alarm discriminator 20 includes an event code indicator 96 and an alarm condition indicator 98.

Generally speaking, the event code indicator 96 provides means for indicating the type of pulse code last generated by the transmitter 22, either an alarm event code or a reset event code.

The alarm condition indicator 98 indicates the condition of the alarm circuitry connected to the alarm discriminator 20, the circuitry detecting and indicating either an alarm condition, here corresponding to an open circuit, or a reset condition, that being a closed circuit.

As previously described, the alarm discriminator 20 is designed to generate an event signal, that being the connection of $V_{bb}$ to terminal B, upon the occurrence of an event in the alarm discriminator. An event may be defined as occurring when the event code indicator 96 indicates that the code last generated by the transmitter 22 was a reset code and the alarm condition indicator 98 indicates an alarm condition, or when the event code indicator indicates the last code transmitted was an alarm code and the alarm condition indicator indicates a reset condition. Either are considered as events, and either will produce a direct connection between $V_{bb}$ and terminal B to enable the transmitter control unit 18 to energize the transmitter 22 and cause the transmitter to generate a coded signal corresponding to the condition at the indicator 98.

In the illustrated form of the alarm discriminator 20, the alarm condition indicator 98 comprises a relay R having a winding 100 connected in series with the alarm circuitry associated with the station 10 through a resistor 102 and a switch S–4. The alarm circuitry is designed such that it is normally closed to provide a path for current through the winding 100 to indicate a reset condition. When the alarm circuitry is opened, as by the unauthorized opening of a door or window associated with the station 10, current ceases to flow through the winding 100 thereby causing the relay R to indicate an alarm condition in the indicator 98.

In this regard, the indicator 98 further includes three relay contacts 1, 2 and 3. The contact 2 is movable between contacts 1 and 3 in response to the magnetic field generated by current flowing in the winding 100. When current flows in the winding 100, the contact 2 is attracted against the contact 3 while the contact 2 closes against the contact 1 when current ceases to flow in the winding. Accordingly, the making of contacts 2 and 3 may be defined as a reset condition for the alarm condition indicator 98, while the making of contacts 1 and 2 may be defined as indicating an alarm condition in the alarm condition indicator.

The event code indicator 96 cooperates with the alarm condition indicator 98 and, in the illustrated form, includes a cam T connected to turn with the gear G–2, a cam follower 104, and a three-contact switch S–3. The cam follower 104 is connected to the contact 2 of the switch S–3 to cause the contact 2 to move between contacts 1 and 3 of the switch.

As illustrated, the cam T has a single accurate depression 106 in its periphery. The depression 106 is arranged relative to the depressions 90 and 92 in the cam P such that the cam follower 104 moves out of the depression 106 immediately prior to the completion of the single round of pulse code "23" in the transmitter 22 and rides into the depression 106, immediately prior to the completion of the three-rounds of the pulse code "23" in the transmitter. The contact 2 engages contact 3 when the follower 104 is out of the depression 106 and moves against the contact 1 when the follower is riding in the depression. Accordingly, contact 2 makes with contact 3 of the switch S–3 when the code last transmitted by the transmitter 22 was a reset event code, while contact 2 makes with contact 1 when the code last transmitted was an alarm event code.

From the foregoing, it is appreciated that the contacts 2 and 3 of switch S–3 and relay R are closed when the last code transmitted was a reset event code and alarm circuitry is in a reset condition, while the contacts 1 and 2 of the switch S–3 and the relay R are closed when the last code transmitted was an alarm code and the alarm circuitry is in an alarm condition. In both cases, no "event" is occurring and the $V_{bb}$ is not connected to terminal B. However, when the contacts 1 and 2 of one of the indicators 96 and 98 are closed and the contacts 2 and 3 of the other indicator are closed, an "event" is occurring and an event signal, that is, $V_{bb}$, is applied to terminal B.

To provide for such operation, contacts 1 and 3 of the relay R and switch S–3, respectively, are connected together and to terminal F leading to the special logic 24. Contact 2 of switch S–3 is connected to terminal B, while contact 2 of relay R is connected in common to contact 1 of switch S–2 and to $V_{bb}$. Contact 3 of relay R is connected through a switch S–5 to terminal D and hence through the special logic 24 to terminal E which is connected to contact 1 of switch S–3.

With such a connection between the indicators 96 and 98, when the event code indicator 96 is indicating that the last code transmitted by the transmitter 22 was a reset event code, the event code indicator is in the position illustrated with contact 2 making with contact 3 in switch S–3. When an alarm condition occurs corresponding to an open circuit in the alarm circuitry connected to terminals J and J', contact 2 moves to contact 1 of the relay R. This causes $V_{bb}$ to be applied directly through the relay contacts 1 and 2, and the contacts 2 and 3 of switch S–3 to terminal B. Assuming that the transmission line 12 is clear, this enables the transmitter control unit 18 to energize the transmitter 22 causing the motor M to begin to turn the wheel W and the switch S–1 to begin to transmit the code "23." As the wheel W begins to turn, the follower 94 moves out of the depression 90 and onto the raised surface of the cam P to traverse an arc of 270°. As this occurs, the contacts 1 and 2 of switch S–2 close to lock the motor M in an energized staate while the cam follower 94 moves along the periphery of the cam P between the depressions 90 and 92. While this is occurring, the transmitter 22 generates and transmits three rounds of the pulse code "23" to indicate an alarm event at the station 10.

Prior to the completion of the alarm event code, the follower 104 moves into the depression 106 in the cam T. As this occurs, the contact 2 moves from the contact 3 to the contact 1 in the switch S–3. The event code indicator 98 thus indicates that the last code transmitted was an alarm event code.

The breaking of contacts 2 and 3 of switch S–3 and the making of contacts 1 and 2 removes $V_{bb}$ from terminal B so long as the alarm circuitry remains in an alarm condition with contact 2 against contact 1 in relay R. Accordingly, as the follower 94 moves into the depression 92, power is removed from the motor M and the motor halts.

However, if, prior to the completion of the alarm event code, or subsequent thereto, the alarm circuitry is again placed in a reset condition, contact 2 moves against contact 3 in relay R. The alarm condition indicator 98 thus indicates a reset condition while the event code indicator 96 indicates that the last code transmitted was an alarm event code. This defines a reset event and an event signal, $V_{bb}$, is again applied to terminal B.

More particularly, the closing of the contacts 2 and 3 in the relay R causes $V_{bb}$ to be applied through switch S–5 to terminal D. This in turn causes $V_{bb}$ to be transmitted through the special logic 24 and to appear at terminal E where it is applied through the closed contacts 1 and 2 of switch S–3 to the terminal B.

If the line 12 is clear, $V_{bb}$ at terminal B again enables the transmitter control unit 18 to cause $V_{bb}$ to appear at terminal C. $V_{bb}$ at terminal C again energizes motor M to cause the switch S–1 and wheel W to transmit a single round of "23" while the follower 94 rides on the raised portion of the cam P between the depressions 92 and 90.

While the follower 94 is riding on the raised portion of the cam P between the depressions 92 and 90, the follower 104 moves out of the depression 106 in the cam T to the raised position illustrated in FIG. 2. In this position, the event code indicator 96 indicates that the last pulse code generated by the transmitter 22 was a reset code—the contacts 2 and 3 of switch S–3 being closed and $V_{bb}$ being removed from terminal B. Accordingly, when the follower 94 moves into the depression 90, the motor M is deenergized, the alarm condition indicator 98 also indicating that the alarm circuitry is in a reset condition. At the completion of the foregoing operations, the alarm discriminator 20 is again ready to develop an event signal, $V_{bb}$, at the terminal B upon the occurrence of an alarm condition in the alarm circuitry. The discriminator is also ready to control the transmitter 22 to generate an event code corresponding to the alarm condition.

In addition to generating an event signal upon each occurrence of an event, and in addition to programming the transmitter 22 to generate pulse code signals corresponding to the events monitored by the alarm circuitry, the discriminator 20 includes means for automatically storing event signals if the transmission line 12 is occupied at the time an event occurs. Such means is represented by the term "storage" in FIGURE 1 and includes, by way of example, the circuit indicated by the numeral 107 in FIGURE 2.

As represented, the storage 107 comprises a transistor 108 of an NPN type having its collector connected to the contact 1 of relay R, and its emitter connected to a junction of the winding 100 and the resistor 102. The base of the transistor is connected to a resistor 109 which in turn is connected to termnal B and to contact 2 of the switch S–3.

In operation, when an alarm event occurs, that is, when the alarm condition indicator 98 indicates an alarm condition and the event code indicator 96 indicates that the last code transmitted was a reset signal, an event signal is developed by the discriminator 20 which is stored in the storage 107 until the proper code transmission has been started. In this respect, the alarm condition occurs when the alarm circuitry is opened. $V_{bb}$ is then applied through the closed contacts 1 and 2 of the relay R to the collector of the transistor 108. $V_{bb}$ also appears at terminal B to bias the base of the transistor 108. The simultaneous application of bias to the collector and base of the transistor 108 causes the transistor to conduct and effectively short-circuit the relay R to lock the alarm condition indicator 98 in alarm condition. Thus, the alarm condition produced from a momentary break or short-circuit in the alarm wiring is maintained by a feedback arrangement until the switch S–3 changes state to indicate that the transmitter 22 has been enabled and is transmitting a code corresponding to the alarm event signal. When this occurs, the relay R and the alarm condition indicator 98 are free to reset if the alarm circuitry associated therewith has been restored.

Since the event signal corresponding to an alarm event is stored in storage 107 until the switch S–3 changes state, the event signal is stored until such time as the transmission line 12 is unoccupied, the appropriate delays have been introduced by the timing circuits 16, and the transmitter control unit 18 has been enabled to excite the transmitter 22 to begin transmitting the appropriate code signal.

SPECIAL LOGIC

As previously indicated, it is a function of the special logic 24 to combine a predetermined sequence of events in the alarm discriminator 20 and to cause the discriminator to develop a single event signal in response to the sequence of events. Preferably, the special logic 24 is designed to combine the events surrounding the closing of the station 10 into a single event signal and to cause the transmitter 22 to transmit a single round of the number "23" to the central office. In this manner, the special logic 24 materially reduces the time which would otherwise be associated with a closing operation and allows the receiving equipment at the central office to be more efficiently employed.

To accomplish the foregoing, the special logic 24 comprises a bi-stable device 110, here represented as being a four terminal silicon-controlled switch. The anode of the switch is connected to the terminal D while the anode gate electrode is connected through a resistor 112 to the terminal D. The cathode of the switch 110 is connected through a diode 114 to terminal E and through a resistor 116 to ground. The cathode gate electrode of the switch 110 is connected to a junction of a diode 118, a capacitor 120 and a resistor 122. The anode of the diode 118 is connected to a resistor 124 and hence, to the terminal F. The capacitor 120 is connected between the cathode gate electrode and a junction of the diode 114 and a resistor 116. The resistor 122 is connected to ground and the capacitor 120 and the combination functions to prevent stray noise from triggering the switch 110 prematurely.

Prior to the actual closing operation at the station 10, the switches S–4, S–5 are in an "off" position. Also, with S–4, S–5 in the "off" position, the anode of the silicon-controlled switch 110 is disconnected from the supply and the switch 110 is nonconducting. The alarm condition indicator 98 is indicating an alarm condition while the event code indicator 96 is indicating that the last code generated by the transmitter was an alarm code, that code being initiated by the opening up of the station building in the morning. Accordingly, contacts 1 and 2 of switch S–3 are closed prior to the closing operation of the station 10.

To close the station 10, the switches S–4, S–5 are moved to the "on" position indicated in FIGURE 2. $V_{bb}$ is then applied to terminal D through closed contacts 2 and 3 of the relay R and the closed switch S–5 provided the circuitry connected to JJ' is closed. However, the silicon-controlled switch 110 remains nonconductive since there is no gate current applied thereto.

The next step in the closing operation is the opening of the exit door. As this occurs, an alarm condition appears at the relay R and contact 2 moves against contact 1 to supply gate current to the silicon-controlled switch 110 through the resistor 124 and the diode 118. At the same time, a reduced current flows into the anode of the silicon-controlled switch 110 through a relatively large resistor 126 connected between $V_{bb}$ and terminal D. The gate current is sufficient to trigger the silicon-controlled switch 110. However, the current flow through the resistor 126 and the switch 110 although sufficient to maintain the switch conducting is insufficient to enable the transmitter control unit 18. Rather, the current flows through the conducting switch 110 to ground.

The next step in the closing operation is the closing of the exit door. This removes the alarm condition and returns the alarm condition indicator 98 to its reset condition. As this occurs, the contact 2 moves against the contact 3 of the relay R. The alarm condition indicator 98 then indicates a reset condition while the event code indicator 96 indicates that the last code generated was an alarm event code. Under such conditions, an event signal, that is $V_{bb}$, is applied through the switch 110, and the closed contact 1, 2 of switch S–3 to terminal B. If the transmission line is then unoccupied, the event signal energizes the transmitter control unit 18 to excite the transmitter 22 causing the transmitter to transmit a reset code signal corresponding to a single round of pulse code "23."

At the termination of the pulse code "23," the alarm condition indicator 98 is still in the reset condition while the event code indicator 96 indicates that the last code transmitted was the reset event code. Under such conditions, the transmitter 22 is deenergized to wait for the occurrence of an alarm condition in the circuitry connected to the alarm discriminator 20 subsequent alarm and reset occurrences being handled separately rather than as a group as during closing.

SUMMARY OF OPERATION

By way of summary, the monitor 14 monitors the signals on the transmission line 12 and provides an indication of a clear or occupied line corresponding to a charged or discharged capacitor 42 in the timing circuits 16. When the transmission line 12 is occupied and an event occurs in the alarm circuitry connected to the discriminator 20, an event signal is generated which is simultaneously stored in the storage 107 and applied to the timing circuits 16. In the timing circuits 16 the event signal introduces a predetermined time delay Y into the operation of the transmitter 22. In particular, the capacitor 42 is prevented from charging for a time corresponding to Y minus X. Thereafter, when the transmission line becomes clear, the capacitor 42 is prevented from reaching a charged condition for a period of time X. X corresponds to the maximum time interval between pulses transmitted from other stations and assures that the capacitor 42 does not reach a charged state sufficient to enable the transmitter control unit 18 until the transmission line 12 is truly clear of all transmission from other stations.

When the capacitor 42 is charged to indicate that the transmission line 12 is clear, the event signal from a storage 107 at the terminal B enables the transmitter control unit 18 to energize the transmitter 22. The transmitter 22 then commences generation of an alarm event code on the transmission line 12.

At the completion of the alarm event code, the transmitter 22 is deenergized unless the alarm condition has been removed. If the alarm condition has been removed, the transmitter 22 transmits the reset event code indicative of the resetting of the alarm circuitry.

If the transmission line 12 is unoccupied at the time an event occurs, the transmitter control unit 18 is immediately enabled and overrides operation of the timing circuits 16 to immediately energize the transmitter 22 to transmit the appropriate coded signal.

From the foregoing description, it is appreciated that the present invention provides an alarm system which permits a plurality of stations to use a common transmission line without fear of losing alarm signal information. This, the present invention accomplishes by providing means at each station for delaying the transmission of alarm signal information from the station until the common transmission line is clear of transmission from other stations.

I claim:

1. An alarm system for a plurality of different stations connected by common transmission line to a central office, each station comprising:

a transmitter connected to said transmission line for generating an alarm signal indicative of an alarm event and a reset signal indicative of a reset event, that being a correction of an alarm event;

first circuit means connected to said transmission line for monitoring electrical signals on said transmission line and for indicating when said line is clear and when said line is occupied;

second circuit means for (1) developing an event signal upon the occurrence of an alarm or reset event, (2) holding said event signal when said first circuit means indicates that said transmission line is occupied, and (3) controlling said transmitter to generate the signal which corresponds to the type of event occurring;

and third circuit means connected to said first and second circuit means and to said transmitter for energizing said transmitter in response to said event signal when said first circuit means indicates that said transmission line is clear.

2. The alarm system of claim 1 wherein each station further includes delay means responsive to an event signal from said second circuit means for delaying the indication by said first circuit means of a clear line for a predetermined time after said line is clear if said line is occupied when said event signal occurs.

3. The alarm system of claim 2 wherein:

said first circuit means includes a capacitor and means for discharging said capacitor when said transmission line is occupied;

and said delay means includes means for charging said capacitor and means responsive to an event signal from said second circuit means for halting said charging means for a predetermined period of time after said transmission line is clear.

4. An alarm system for a plurality of different stations connected by a common transmission line to a central office, each station comprising:

a transmitter connected to said transmission line for generating an alarm signal indicative of an alarm event and a reset signal indicative of a reset event, that being a correction of an alarm signal;

first circuit means connected to said transmission line for monitoring electrical signals on said transmission line and for indicating when said line is clear and when said line is occupied, said first circuit means including a capacitor and means for discharging said capacitor when said transmission line is occupied;

second circuit means for (1) developing an event signal upon the occurrence of an alarm or reset event, (2) holding said event signal when said first circuit means indicates that said transmission line is occupied, and (3) controlling said transmitter to generate the signal which corresponds to the type of event occurring;

delay means responsive to an event signal from said second circuit means for delaying the indication by said first circuit means of a clear line for a predetermined time period after said line is clear if said line is occupied when said event signal occurs, said delay means including means for charging said capacitor and means responsive to an event signal from said second circuit means for halting said charging means for a predetermined time period after said transmission line is clear; and third circuit means connected to said first and said second circuit means and to said transmitter for energizing said transmitter in response to said event signal when said first circuit means indicates that said transmission line is clear, said third circuit means including means responsive to an event signal for maintaining a charge on said capacitor when said capacitor is charged at the time of said event signal to indicate a clear transmission line, said third circuit means thereby overriding said delay means when said first circuit means is indicating a clear line at the time of an event signal.

5. The alarm system of claim 1 wherein said third circuit means at each station includes means associated with said first circuit means for locking said transmitter in an energized condition at least until the completion of the signal which it is controlled to generate once said transmitter is energized by overriding the indication that said transmission line is occupied.

6. An alarm system for a plurality of different stations connected by common transmission line to a central office, each station comprising:

a transmitter connected to said transmission line for generating an alarm signal indicative of an alarm event and a reset signal indicative of a reset event, that being a correction of an alarm event;

first circuit means connected to said transmission line for monitoring electrical signals on said transmission line and for indicating when said line is clear and when said line is occupied;

second circuit means for (1) developing an event signal upon the occurance of an alarm or reset event, (2) holding said event signal when said first circuit means indicates that said transmission line is occupied, and (3) controlling said transmitter to generate the signal which corresponds to the type of event occurring;

and third circuit means connected to said first and second circuit means and to said transmitter for energizing said transmitter in response to said event signal when said first circuit means indicates that said transmission line is clear; and logic circuit means connected to said second circuit means for causing said second circuit means to develop a single event signal in response to a predetermined sequence of events in said second circuit means.

7. The alarm system of claim 6 wherein:

said second circuit means include an alarm switch for opening and closing in response to and thereby indicating alarm and non-alarm conditions in an associated alarm detecting circuit;

and said logical circuit means includes a bistable device and means for connecting said bistable device to said alarm switch to switch said device between states and cause said second circuit means to develop an event signal only in response to a predetermined sequence of openings and closing of said alarm switch.

8. An alarm system for plurality of different stations connected by common transmission line to a central office, each station comprising:

a transmitter connected to said transmission line for generating an alarm signal indicative of an alarm event and a reset signal indicative of a reset event, that being a correction of an alarm event;

first circuit means connected to said transmission line for monitoring electrical signals on said transmission line and for indicating when said transmission line is clear and when said line is occupied;

second circuit means for (1) developing an event signal on the ocurrence of an alarm or reset event, (2) holding said event signal when said first circuit means indicates that said transmission line is occupied, and (3) controlling said transmitter to generate the signal which corresponds to the type of event occurring, said means for developing an event signal upon the occurrence of an alarm or reset event and said means for controlling said transmitter to generate a signal which corresponds to the type of event occurring in said second circuit means includes an alarm switch means for opening and closing in response to and thereby indicating alarm and non-alarm conditions in an associated alarm detecting circuit, signal indicating means for indicating the type of signal last developed by said transmitter, and circuit means connecting said alarm switch means and said signal indicating means to produce an event signal when said alarm switch means indicates said alarm or non-alarm condition and said signal indicating means indicates that said transmitter has last developed said reset or alarm signals, respectively; and third circuit means connected to said first and second circuit means and to said transmitter for energizing said transmitter in response to said event signal when said first circuit means indicates that the transmission line is clear.

9. The alarm system of claim 1 wherein said first circuit means includes a transformer for a coupling only A-C signals on said transmission line to a circuit for indicating when said line is clear and when said line is occupied.

References Cited

UNITED STATES PATENTS

| | | | |
|---|---|---|---|
| 961,853 | 6/1910 | Garratt et al. | 340—217 |
| 2,694,196 | 11/1954 | Baker | 343—177 |
| 3,099,826 | 7/1963 | Noreen et al. | 340—213.2 |
| 3,105,121 | 9/1963 | Field | 179—5 X |

JOHN W. CALDWELL, Primary Examiner

P. PALAN, Assistant Examiner

U.S. Cl. X.R.

340—215, 216, 295